United States Patent [19]

Schonberger

[11] 4,317,367
[45] Mar. 2, 1982

[54] FEVER THERMOMETER, OR THE LIKE, SENSOR

[76] Inventor: Milton Schonberger, 195 Fern St., Westwood, N.J. 07675

[21] Appl. No.: 41,551

[22] Filed: May 23, 1979

Related U.S. Application Data

[63] Continuation of Ser. No. 779,152, Mar. 18, 1977, abandoned.

[51] Int. Cl.³ .............................................. G01K 7/22
[52] U.S. Cl. ................................... 73/362 AR; 338/28
[58] Field of Search ........... 73/362 AR; 338/13, 22 R, 338/25, 28

[56] References Cited

U.S. PATENT DOCUMENTS

| | | |
|---|---|---|
| 2,482,316 | 9/1949 | Blocking . |
| 2,753,714 | 7/1956 | Perkins et al. . |
| 2,862,126 | 11/1958 | Ploke et al. .................. 338/13 X |
| 2,937,354 | 5/1960 | Mazzarella et al. ............ 338/22 R |
| 3,019,198 | 1/1962 | Dumesnil .................. 338/22 R X |
| 3,045,198 | 7/1962 | Dolan et al. .......................... 338/13 |
| 3,205,465 | 9/1965 | Lambertson et al. . |
| 3,221,555 | 12/1965 | Biber . |
| 3,349,896 | 10/1967 | Ensign et al. . |
| 3,402,378 | 9/1968 | Catlin et al. . |
| 3,430,336 | 3/1968 | Riddel ..................... 338/22 R X |
| 3,431,781 | 3/1968 | Wiggin . |
| 3,435,400 | 3/1969 | Beckman . |
| 3,469,449 | 9/1969 | Keller . |
| 3,472,074 | 10/1969 | Glang et al. .................... 338/25 X |
| 3,477,055 | 11/1969 | Herbst et al. .................... 338/22 R |
| 3,477,292 | 11/1969 | Thornton ...................... 73/362 AR |
| 3,485,102 | 12/1969 | Glick . |
| 3,500,280 | 3/1970 | Ensign . |
| 3,521,212 | 7/1970 | Waseleski, Jr. et al. . |
| 3,535,935 | 10/1970 | Raudszus . |
| 3,537,053 | 10/1970 | Snoberger et al. . |
| 3,592,059 | 7/1971 | Chilton . |
| 3,600,650 | 8/1971 | Obenhaus et al. . |
| 3,603,150 | 9/1971 | Kurtin et al. . |
| 3,646,494 | 2/1972 | Waseleski et al. ................... 338/25 |
| 3,663,917 | 5/1972 | Mahmoodi . |
| 3,681,993 | 8/1972 | Campton et al. ............. 73/362 AR |
| 3,721,001 | 3/1973 | Crosby et al. . |
| 3,748,439 | 7/1973 | Ting et al. .................... 338/22 R X |
| 3,790,870 | 2/1974 | Mitchell .................... 338/22 R X |
| 3,815,074 | 6/1974 | Nagaia . |
| 3,921,117 | 11/1975 | Blaha .................................. 338/13 |
| 3,929,018 | 12/1975 | Turner . |
| 3,949,609 | 4/1976 | Hammerslag . |
| 4,041,437 | 8/1977 | Matsuura et al. ..................... 338/35 |

FOREIGN PATENT DOCUMENTS 1257148 12/1971 United Kingdom ............ 338/22 R

Primary Examiner—Kyle L. Howell
Assistant Examiner—Joseph W. Roskos
Attorney, Agent, or Firm—Ostrolenk, Faber, Gerb & Soffen

[57] ABSTRACT

A thermistor, which changes its electrical properties as the temperature it senses changes, is inside and may be sealed within a relatively thin sheath having the capacity to transmit heat to the thermistor substantially without diminution; electrical leads are supported on a supporting substrate; the thermistor is electrically connected between the leads and is mechanically supported by at least one of the leads; the leads connected to the thermistor may be held inside the sheath; the sheath over the sensing element is heat or radiation shrinkable and sealable over the sensing element and the leads; various ways of connecting the thermistor to the leads are disclosed; other sensing elements for sensing other conditions may also be employed.

60 Claims, 15 Drawing Figures

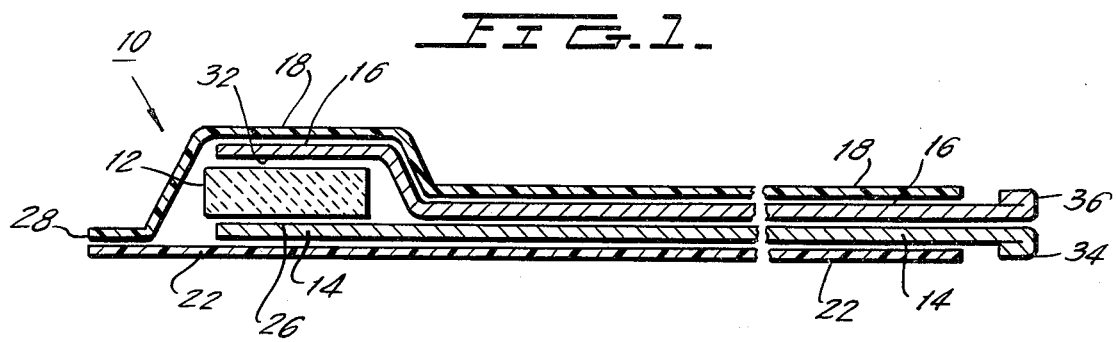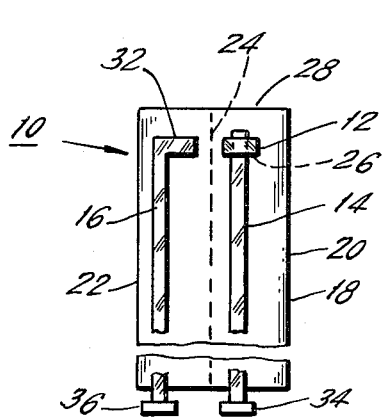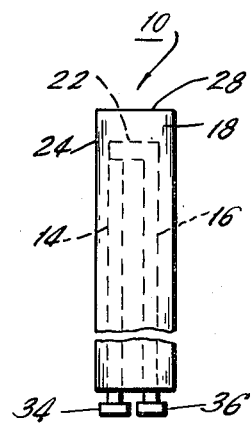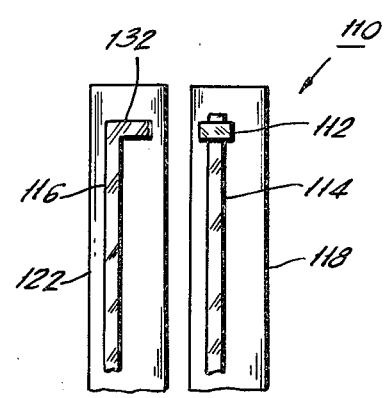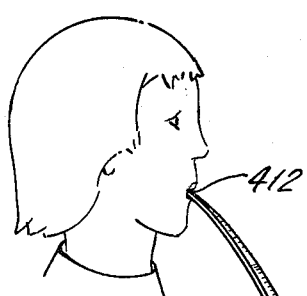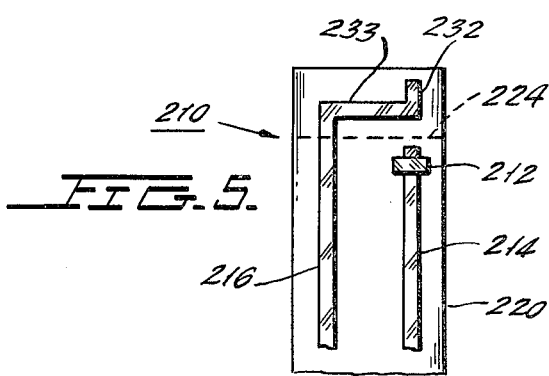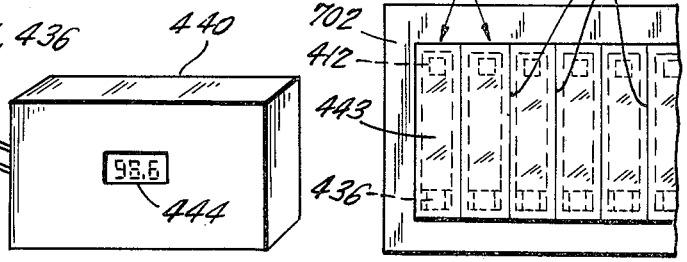

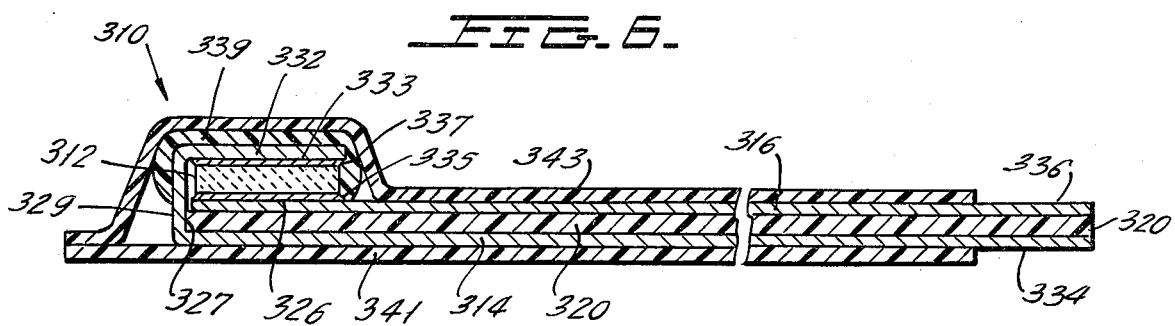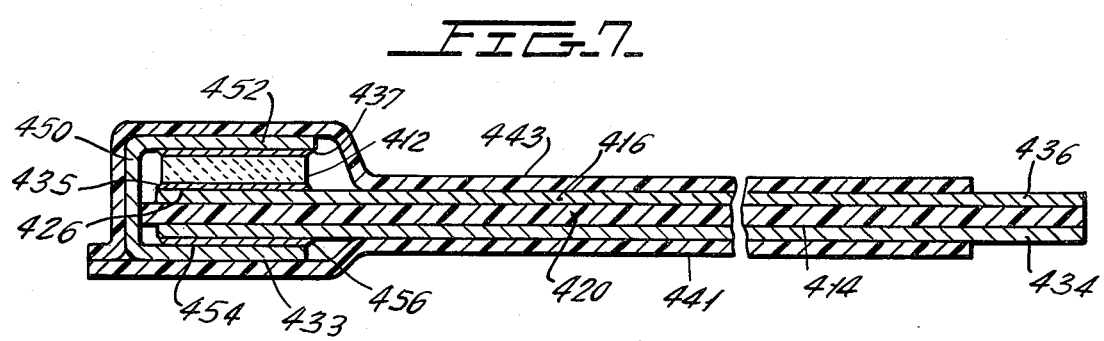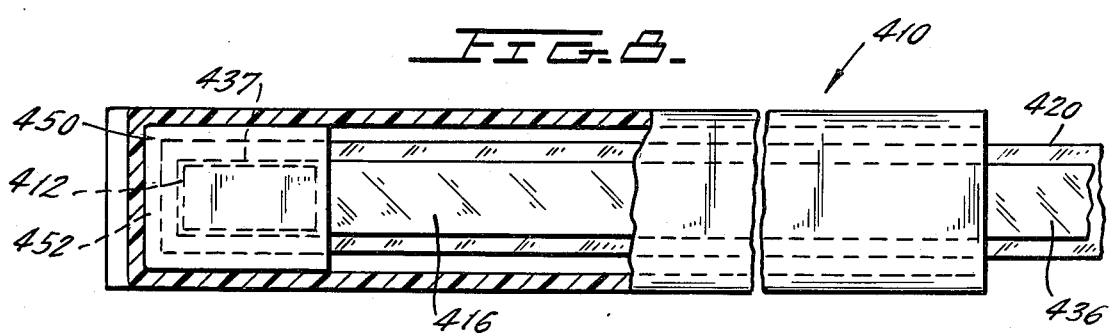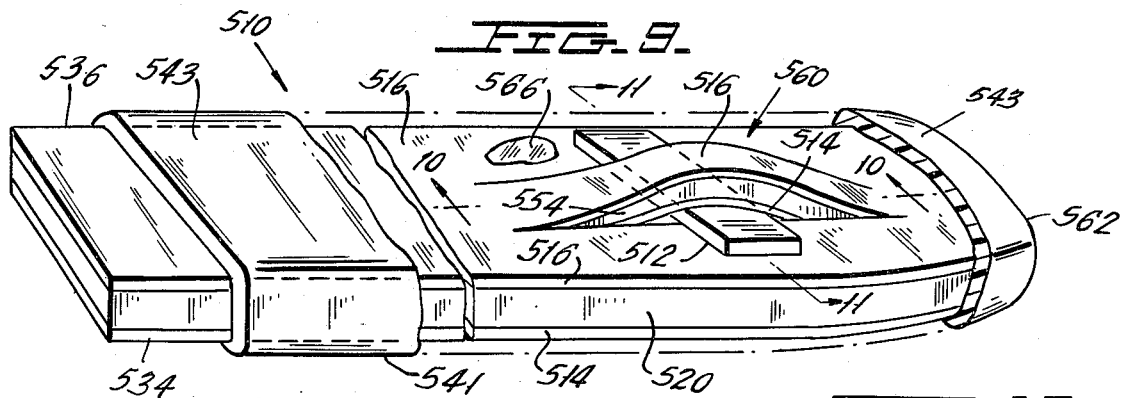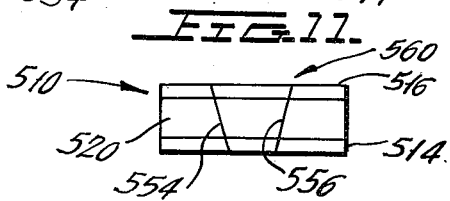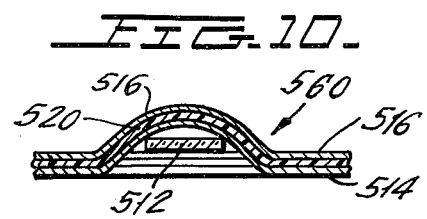

FEVER THERMOMETER, OR THE LIKE SENSOR

This is a continuation of application Ser. No. 779,152, filed Mar. 18, 1977, now abandoned.

FIELD OF THE INVENTION

The present invention relates to a thermometer, particularly a fever thermometer, using a heat sensing and responsive element, to the heat sensing element, to the manner of connecting the sensing element to means for indicating temperature and to the manner of mechanically holding and electrically connecting conductors to the heat sensing element.

The present invention is adapted for use with any sensing element or transducer which changes its electrical properties as the condition being sensed changed. For example, a sensor made according to the present invention could be used for measuring electrical energy, magnetic energy, light, sound, any other forms of energy, and any conditions that are capable of being sensed by a sensor, and particularly a sensor employing either a transducer or any object that changes its electrical properties as the condition being sensed changes. The present invention will be hereafter described in terms of an apparatus for measuring temperature, or a thermometer, but the applicability of the invention to other fields will be apparent and is thus disclosed herein.

BACKGROUND OF THE INVENTION

In thermometers, particularly fever thermometers for adult people, for children and for animals, accuracy is required. Also, the response should be as rapid as possible. Further, the expense of purchase, maintenance and cleaning a thermometer should be as low as possible. Particularly in a hospital, physician's office, other medical facility or veterinary facility, the foregoing factors are quite important.

Cleaning and more particularly sterilizing a thermometer after each use is time consuming and can be expensive. For example, with a standard mercury bulb thermometer, heat sterilization might destroy the thermometer, while other forms of sterilization, like gas sterilization, are relatively expensive. Conventional sterilization techniques are not always as effective as they might be. This can result in reinfection of a patient by a supposedly sterilized thermometer which is still carrying the organisms that had infected that patient and for which that patient was being treated and, on occasion, can cause infection of a patient with organisms from a prior patient.

Repeat use or non-disposable thermometers must be sturdy and strong enough to withstand the mechanical stresses of normal use. The temperature sensing element, such as a mercury bulb or other mechanical element, is accordingly larger and correspondingly slower to respond to a sensed temperature change. For example, there is now available a non-disposable thermometer comprised of a temperature responsive thermistor which is electrically connected in a permanent manner to a temperature indicating meter. This unit and particularly the sensing element thereof must be large enough to not be damaged or destroyed in use.

To overcome the foregoing problems, various relatively inexpensive fever thermometers have been developed, which are disposable in their entirety, or at least that part of the thermometer to which the patient is exposed is disposable. Two examples of single use, completely disposable thermometers, which were developed by the inventor hereof, are shown in U.S. Pat. Nos. 3,379,063 and 3,507,154. It is one goal of the inventor hereof to simplify the fever thermometer even further, make it even less expensive to manufacture, and therefore make it even more practical in use.

An example of a partially disposable thermometer that is presently used comprises a relatively thick temperature-sensing probe over which a replaceable sheath is positioned. The sheathed probe is placed in the patient's mouth for a short time. The patient's body heat reaches the sensing element in the probe through the sheath. Because of the size and volume of the probe and the short duration of the temperature sensing procedure, the temperature of the temperature sensing element in the sheathed probe never rises to the actual temperature of the patient. Therefore, the probe is electrically connected to a relatively expensive predictor circuit which translates the rate of change of temperature of the probe into a digital readout of the actual temperature of the patient, i.e., the circuit predicts what temperature the probe would sense were the probe to finally be heated to the patient's body temperature.

Another problem with a thermometer, and particularly a fever thermometer, is the size and volume of the temperature sensing element and/or the housing or sheath over the temperature sensing element. Usually, this housing or sheath must be heated by the body of the person whose temperature is being sensed, at least in the vicinity of the temperature sensing element, before the temperature sensing element can accurately sense the body temperature. For example, in a standard mercury bulb fever thermometer, the thermometer must be held in place in the patient's body a sufficient time to heat the glass around the mercury bulb and the glass near the mercury bulb, as well as the mercury in the bulb. In the present inventor's prior U.S. Pat. No. 3,507,154, the temperature-sensing element comprises a heat expansible coil in a housing. The thermometer must remain in place in the patient's body at least long enough to heat the entire coil and the housing around the coil. In the above described thermometers which used a heat sensing probe connected to a predictor circuit, because the probe is subject to repeated use, it must be sufficiently mechanically strong. This requires the probe be of relatively large volume and the probe consequently takes longer to heat up, thereby necessitating use of the relatively expensive predictor circuit.

Further, the thicker or heavier the casing and the more temperature conductive it is, the longer the time that elapses before the body whose temperature is being measured heats the temperature sensing element in order that an accurate temperature reading might be taken. Accordingly, it is desirable to minimize the thickness of the housing over the temperature sensing element. (With respect to sensors of other types of energy, or the like, it is similarly desirable to make the casing thinner or, as appropriate, more pervious to the energy or condition being sensed.) In this manner, the thermometer will provide a more rapid reading of the temperature.

Relatively large thermometer housings create a comfort and convenience problem. Body temperature is preferably taken at a location in the body near to arterial blood flow. In a human being, arterial blood flow is near a surface of the body at the end of the rectum, beneath the tongue and under the arm. The larger the size, thickness and volume of the housing of the temperature sensor, the more uncomfortable will be its emplacement and holding in position in the body near arterial blood flow. Conversely, the smaller these dimensions of the housing of the temperature sensor, the more comfortable it will be to keep the thermometer in place. In taking temperatures from small children and animals, for example, accurate readings are difficult to obtain because the patient is made uncomfortable by the emplacement of the thermometer, usually in his rectum, and the squirming of the patient makes it difficult to hold the thermometer in place for the desired minimum time period. If the fever thermometer can be made sufficiently small that the patient will hardly feel its insertion or its presence once inserted and if the time for a temperature taking can be shortened, the patient will not be made uncomfortable and a more accurate temperature reading will be obtainable.

Thermometers, once manufactured, must have an adequate shelf life and must not be damaged by ambient conditions to which they might be exposed following manufacture, including the shocks of transportation, of being placed in and removed from storage, including the relatively rough handling during setup and use, and including the temperature and humidity, and the like conditions, of a storage place. Conventionally available thermometers are sufficiently rugged and protected to withstand normally anticipated ambient conditions. But, when the size and volume of a thermometer is reduced and the sheathing over the temperature sensing element is made thinner and lighter, then a thermometer becomes more delicate and more easily damage by normally encountered and ambient conditions.

SUMMARY OF THE INVENTION

The present invention is an improvement over the above discussed prior arrangements in that the thermistor or other sensing element, which changes its electrical properties dependent upon the temperature to which the thermistor is heated or the condition which the sensing element senses, is small in size and it may be sheathed in a manner that protects the sensing element or thermistor, yet provides ready access to the heat source, other energy sources or other conditions being sensed.

Accordingly, it is the primary object of the present invention to provide an effective thermometer for measuring temperature.

It is another object of the invention to provide a thermometer which accurately reports the temperature being sensed.

It is a further object of the invention to provide a thermometer which responds quite rapidly to temperature changes.

It is a further object of the present invention to provide a thermometer which is relatively small in size.

It is yet another object of the present invention to provide a thermometer which is not uncomfortable to the object having its temperature taken.

It is a further object of the invention to provide such a thermometer, wherein the sensing element is protected from ambient conditions.

It is a further object of the invention to provide a thermometer which is sufficiently sturdy and protected to withstand anticipated conditions experienced prior to and during use.

It is a still further object of the invention to provide a relatively inexpensive thermometer.

It is another object of the invention to provide a relatively easily manufactured thermometer.

It is yet another object of the invention to both electrically and mechanically attach electrical leads to a sensing element of a thermometer.

It is a further object of the invention to realize the foregoing objects in connection with any other type of sensor that includes a sensing element or transducer that changes its electrical properties upon changes in the condition being sensed.

In connection with thermometers and fever thermometers, but, also in connection with any other condition sensors, the present invention is premised upon the ease of manufacture and miniaturization of thermistors and of other sensing elements and transducers.

A thermistor is comprised of a ceramic material comprised of a metallic oxide whose electrical properties, particularly its resistivity, change with the temperature of the thermistor. The ceramic material has two opposite electric contacts affixed to it. Typically, such contacts are silver and to give it the correct consistency, the silver is mixed with glass particles. One way the contacts are applied is by dipping the ceramic in molten contact material. Then the contacts are cooled and shaped on the thermistor.

The size and particularly the surface area of the contacts on the thermistor determines the resistivity of the thermistor.

To adjust the rating of a thermistor, the size and shape of the block of ceramic material is altered. But, a more effective way of adjusting the rating is to change the surface area of one or both of the contacts. The resistivity of the thermistor is directly related to the surface area of its contacts.

Until recently, it was quite expensive to fabricate a thermistor having a particular resistance rating. Now, thermistor manufactures have developed various techniques for accurately adjusting the surface area of the contacts on a thermistor including, but not limited to, laser trimming, coupled with and/or as an alternative to fine grinding. These techniques have enabled the reliable, inexpensive manufacture of small size, accurately rated thermistors. Using a small size thermistor as the temperature sensing element enables fabrication of a small size thermometer. In addition, a small size thermistor has little volume to be heated, whereby it can react to temperature changes quite rapidly, and in connection with fever thermometers, it can be heated to the temperature being measured and react in a few seconds.

A thermistor is electrically connected in circuit with a potentiometer. The sensed change in voltage or resistance indicated on the gauge of the potentiometer can be accurately calibrated in terms of the temperature of the thermistor.

Electrical leads connect the thermistor to the potentiometer. The leads must be affixed to the thermistor. A standard technique is to solder the leads directly to the contacts of the thermistor. But, when a thermistor is quite small, e.g. less than a millimeter in each dimension, the thickness of the leads, coupled with the thickness of the bead of solder holding each lead to the thermistor, creates a combined structure which is sometimes more than six times larger in cross-section than the bare thermistor. An object relatively so much larger than the thermistor alone is slower to change its temperature to the temperature being sensed and will undesirably enlarge the heat sensing element to be sealed in a sheath with perhaps a reduction in the secureness of the seal.

Further, it is usual to use wire leads. The wire itself has thickness and is heat conductive, whereby the wires soldered to the thermistor will conduct some of the heat away from the thermistor and further slow its response to the temperature being sensed. It is desirable, therefore, to reduce the thickness and heat conductivity of the conductors leading to the thermistor.

Furthermore, it is necessary to effectively electrically connect the conductors to the thermistor and to ensure that both the mechanical and the electrical connection of the conductors to the thermistor is durable.

In accordance with one aspect of the invention, the conductors can be thin, foil like, metal strips, rather than thicker wires. The foil strips are mechanically and electrically secured to the oppositely polarized electric contacts of the thermistor. The foil strips are each supported on an appropriate respective supporting substrate.

According to the invention, the foil strips are carried on a non-conductive substrate. In some embodiments, the foil strips are carried on respective opposite surfaces of that substrate. In other embodiments, the foil strips are carried on the same surface of a substrate but are gap separated from each other. The non-conductive substrate may comprise a plastic and particularly a Mylar strip of rigidity sufficient to prevent the foil strips from undesirably wrinkling or tearing, yet of sufficient flexibility to permit bending of the conductors to enable positioning of the thermometer as required. The substrate and foil strips may be produced in a continuous assembly ribbon and are then cut into sections each of a length of one thermometer.

In some embodiments, one contact at one side of the thermistor sits near the end of one foil strip conductor on one surface of the substrate. A connecting clip or a piece of the second foil strip conductor extends from the second foil strip conductor, around the substrate, to the other contact at the opposite side of the thermistor.

In a modified arrangement, the substrate having the foil strips on opposite surfaces is deformed so as to move each foil strip into engagement with a respective thermistor contact. For example, a single cut may be made in or a strap may be cut into the substrate. Then one cut portion of the substrate or the strap is then deformed with respect to the rest of the substrate so that one side and one contact of the thermistor rests against one side of the substrate and the first conductor thereon and the other substrate surface or strap surface carrying part of the second foil strip conductor is rested against the other side and the other contact of the thermistor.

In other embodiments, both conductive foil strips are on the same surface of one substrate or on the surfaces of two respective substrates. In one of these embodiments, the substrate or substrates for both of the foil strip conductors are overlaid so that the foil strips face toward and are opposed to each other at their contact sections over the thermistor. The thermistor is interposed between the contact sections. One contact at one side of the thermistor contacts one of the foil strip contact sections and the other contact at the opposite side of the thermistor contacts the other foil strip contact section.

Alternatively, the foil strips may be spaced from each other on a single foldable substrate and the substrate may be folded to bring the contact sections of the foil strips over the contacts of the thermistor. In another of these embodiments, the two foil strips may be spaced from each other on their substrates and a third connecting foil strip which is permanently joined to one of the other foil strips may be placed over the thermistor to join the two conducting foil strips onto the thermistor.

In another more preferred one of these embodiments, the foil strips on one surface of a substrate are spaced apart a distance that is shorter than the length of the thermistor between its contacts so that each thermistor contact rests against a respective conductor contact section. In the preferred version of this arrangement, both thermistor contacts are on the same long surface of the thermistor and the thermistor contacts sit on the conductor contact sections. Appropriate means hold the thermistor in place, as described further below.

Other arrangements can be envisioned for positioning conductors or foil strips to be in engagement with the thermistor.

The contact sections of the conductive foil strips must be securely electrically connected to the contacts of the thermistor. Additionally, the foil strips must be mechanically joined to the thermistor. As previously noted, the mass of the temperature sensing element, and in this case including any means for holding the foil strips to the thermistor, should be minimized so that the thermistor temperature will readjust itself to the temperature to which the thermistor is exposed as rapidly as possible. One technique for securing the foil strips to the thermistor is to solder them. The solder is applied as a thin tinning layer on the foil strips and/or the thermistor contacts. Then the foil strips and the thermistor are mechanically overlaid in one of the ways previously described. Finally, the assembly is heated sufficiently to melt the solder and secure the thermistor to the foil strips.

The melted solder fills in the interstices of the foil strips and thermistor contacts, if any, and conforms to the contour of the thermistor contacts. The melted solder moves out from under the thermistor and forms a shock protection cushion for the thermistor on the foil strips.

One of the problems with certain thermistors is that when their temperature is raised to a high level, such as 300° F., the thermistors are damaged so that they will no longer predictably and accurately change their electrical characteristics due to changes in the temperature to which they are exposed. Thus, the solder that is used to hold the thermistor on the foil strips should have a melting temperature that is sufficiently high that the solder will not remelt under the normal conditions to which the thermometer will be exposed in storage, transportation and eventual use, but that is sufficiently low that melting of the solder will not damage the thermistor. For example, a typical thermistor that is used in connection with the present invention can be safely heated up to 300° F. without suffering damage. One solder that is contemplated for use in holding the foil strip conductors to the thermistor has its melting point around 250° F. One example of this would be an indium-gallium solder, although other solders with the above described characteristics are available.

Another alternative is to hold the thermistors in place on the conductors with a hot melt adhesive material which may be conductive. This material should satisfy the melting point limitations of the solder, as discussed above. The melted adhesive flows around the thermistor and the conductors and holds the entire assembly together. The adhesive also moves out from under the thermistor and defines a cushion for the thermistor. Further still, with a nonconductive adhesive, enough of the adhesive may be provided to encapsulate the thermistor and maybe also the foil strips in the vicinity of the thermistor, making a stronger assembly.

Another technique for holding the thermistor to the conductors involves reliance upon the characteristic of the "memory" of the substrate for the conductors which naturally biases the substrate to return to its original shape. An elongated substrate of a material with memory, e.g. a resilient plastic, such as Mylar, is then used as the substrate. The substrate is cut, and it is then deformed at the cut. The thermistor is held between the mutually deformed sections of the substrate, as the substrate tries to return to its original shape.

One embodiment using this thermistor securement technique simultaneously mechanically supports the thermistor and electrically connects its contacts to the conductors. The substrate is coated on two opposite elongated surfaces with first and second conductive foil layers, respectively. The thermistor has its contacts on its opposite surfaces. At the end of the substrate that is to support the thermistor, the assembly comprised of the substrate and the foil layers is cut by at least one cut through both of the conductive layers and the substrate. The cut does not extend completely across the assembly from side to side. A first portion of the assembly at one side of the cut is then deformed with respect to a second portion of the assembly at the other side of the cut so that the first conductive layer on one surface of the substrate and at the first portion of the assembly is shifted to be raised above the second conductive layer on the opposite surface of the substrate and at the second portion of the assembly. The thermistor is then placed between the separated conductive layers and the thermistor is mechanically held in place between these conductive layers as the substrate seeks to return to its original undeformed condition. Simultaneously, good electric contact is established between the thermistor contacts and the conductors.

In a variant of the just discussed arrangement, two generally parallel cuts are formed, defining a strap between them. The cuts are preferably defined wholly within the periphery of the assembly, which increases the biasing return force of the substrate. At both cuts at both sides of the strap, the strap serves as the above described first portions of the assembly, whereas the second portions of the assembly are defined at the other side of both cuts. The deformation of the assembly involves raising the strap with respect to the rest of the assembly. The thermistor is then placed under and fully across the raised strap, whereby it is held between the strap and the remainder of the substrate as the strap seeks to restore itself to its original position. With the first conductor beneath the strap engaging one side or contact of the thermistor and with the second conductor atop the substrate engaging the other side or contact of the thermistor, the thermistor is securely held in place mechanically and is at the same time securely electrically connected to both conductors. This arrangement may eliminate the need for any solder or conductive adhesive material to hold the thermistor in place.

In another embodiment using a deformation of the substrate to hold the thermistor, both conductive foil layers are applied on one surface of the substrate. The one cut in the substrate or the two cuts in the substrate which produce a strap, as in the previous embodiment, permit deformation of the substrate to hold the thermistor in place over the conductive strips. In this embodiment, the cut or cuts do not pass through the conductive strips, but through the substrate at a location away from the conductors. In a preferred version of this embodiment, the conductive strips are near to each other but spaced apart from each other on the substrate. The cuts are made between the conductive strips, thereby defining the strap between the conductors. Deforming the substrate by raising the strap and then slipping the thermistor beneath the strap and then releasing the deformed strap secures the thermistor between the strap and the remainder of the substrate. The size and shape of the thermistor, the placement of the strap and the placement of the conductive strips enables the thus secured thermistor to have its contacts engage the contact sections of both conductors.

In all of the embodiments involving a substrate coated on one surface or on different surfaces with a conductive foil layer, the assembly sections forming each thermometer can be cut from a continuous ribbon of coated substrate. The thermistors can be attached to the separated sections of the substrate after individual thermometer assemblies are cut or the thermistors can be attached to the continuous ribbon at spaced intervals, each equal to one thermometer assembly, before the ribbon is cut.

The thermistor joined electrically and perhaps mechanically together with two conductors on a supporting substrate means provide a complete thermometer. But, the conductors and a thermistor are exposed to ambient conditions. Were the thermistor and conductor now emplaced in an environment where a short circuit could be completed across the conductors, the thermometer would not operate. For example, the exposed thermistor and conductor assembly could determine the temperature of air, a non-conductive gas, a non-conductive liquid or fluid or a solid. But, were the thermistor inserted into an environment in which an electric circuit could be completed directly across the conductors without passing through the thermistor, then the temperature sensor would not operate. Examples of an environment that would short circuit the conductors include any liquid filled or moist environment where the liquid or moisture contains electrolytes, e.g. the mouth, or where the surface against which temperature is being measured is a conductive surface and that surface is permitted to contact both conductors at the same time, as might occur in the mouth or the rectum of a patient whose temperature is being taken.

To protect against the short circuiting of the conductors, and, additionally, to protect the thermistor and the connection between the thermistor contacts and the conductors from harm due to rubbing, handling, etc. during manufacture, packaging, storage, transportation, unpacking and ultimate use of the thermometer, the thermistor and the conductors, at least in the vicinity of the thermistor, are enclosed in a protective sheath which is pervious to the condition being sensed, i.e. to heat, but which excludes entrance of anything that would short circuit the conductors.

In the case of the conductors being carried on different surfaces of a substrate or on the same surface of a substrate, the sheath may be a separate pouch or pocket into which the assembly of the conductors, substrate and thermistor are inserted. In a situation where the conductors are held on substrate layers of sufficient size to permit this, the substrates for the conductors are folded or positioned to hold the conductors and the thermistor between the substrates. The now covering substrates are then joined together, whereby the substrates both support the assembly and define the sheath for it. In all cases, the sheath seals around the thermistor and around the conductors at least in the vicinity of the connector sections thereof. A sufficiently tight sheath would have the further advantage that it will hold the thermistor and the conductors in the same relative positions and would squeeze them together to help provide an effective electrical and mechanical connection between the conductors and the thermistor. This would cooperate with solder, adhesive or the "memory" of a deformed substrate, where any of these is used, to hold the thermistor and conductors together.

According to yet another feature of the invention, the entire pocket like sheath for the thermistor and the conductors, or at least part of the sheath, is comprised of a shrinkable material, typically a heat shrink or radiation shrink material. Once the thermometer has been assembled, the entire assembly is secured together, at least in part by shrinking of the sheath. This can establish good mechanical and electrical contact between the thermistor and the conductors either in place of or in conjunction with the above described hot melt solders or adhesives.

Heat shrinking of a sheath around conductors to effect electrical contact is known, for example, from U.S. Pat. Nos. 3,320,355; 3,908,267 and 3,925,956. But, this aspect of the invention relates to more than heat shrinking to effect contact. Instead, the invention is directed to the creation of a thermometer with simultaneous electrical and mechanical connection of the conductors to the thermistor.

The material of which the sheath is comprised, at least in the vicinity of the thermistor, is sufficiently thin to enable rapid conduction of heat from the source whose temperature is being sensed across the sheath and to the thermistor. The use of a small size, light weight thermistor, coupled with thin, perhaps foil-thin, conductors reduces the size and weight of the sensor such that the sheath can be light weight and thin while still providing effective sheathing.

When the material of which the sheath is comprised is thin to allow rapid conduction of heat from the object whose temperature is being sensed to the thermistor, the sheath material may also be soft and flexible and may stretch, especially during long term storage or rough handling. The solders or adhesives or the substrate material with "memory" described above ensure that contact between the conductors and the thermistor remains good.

The conductors lead away from the thermistor a distance sufficient to enable the conductors to be connected to a potentiometer while the thermistor is in place sensing temperature. The conductors are supported over their entire length by their respective substrates. At the ends of the conductors remote from the thermistor, electric contact means are formed. The contact means can be plugged into or otherwise connected with cooperating contacts of the potentiometer. Preferably, the connection between the conductor contacts and the potentiometer contacts is mechanically quite easy to make and break. Thus, each thermometer can be attached to the potentiometer for use and can be detached, and perhaps discarded, after use.

In all embodiments wherein the conductors are applied to any surfaces of the same substrate, the contact means of each conductor comprise the end portion of the conductor away from the thermistor. These conductor end portions are securely attached on their substrate with the rest of their conductors. The conductor end portions and the substrate portion to which they are attached are plugged into a plug socket that includes pressure contacts that are placed to engage the inserted conductor end portions. The contacts in the plug socket are, in turn, connected to the potentiometer.

Useful contact means can also be formed by the conductors being folded, widened, thickened, or otherwise reshaped to comprise electrical contacts. Alternatively, any other form of contact means may be formed or defined on or attached to the ends of the conductors in a form that is appropriate to engage the contacts of the potentiometer or those leading to the potentiometer.

It is apparent that the thermometer according to the invention would have application in hospitals or other medical facilities, because such a thermometer could be removed from a supply, quickly attached to a potentiometer, used once and then discarded. Thermometers according to the invention could be arranged side by side on a card or roll, with a weakened, e.g. perforated or scored, section between the sheaths of adjacent thermometers enabling the next thermometer in line to be separated from the card or roll. The thermometers could be applied to and adhered to a support and display sheet of paper or the like, with the individual thermometers being peeled from their support and display sheet, as needed. Or, thermometers could be provided on a continuous roll, in which the thermometers are arranged end to end, with adjacent ends being joined at a tearable section. Other arrangements for holding the completed thermometers can be readily envisioned.

The foregoing and other objects and advantages of the invention and the foregoing general description of the invention will be further understood from the following detailed description of preferred embodiments of the invention taken in conjunction with the accompanying drawings.

BRIEF DESCRIPTION OF THE DRAWINGS

FIG. 1 is a side cross-sectional view through a first embodiment of temperature sensing device according to the invention;

FIG. 2 is a plan view of the first embodiment of the temperature sensing device before the device has been completely formed;

FIG. 3 is a plan view of the assembled first embodiment of temperature sensing device according to the invention;

FIG. 4 is a plan view of a second embodiment of temperature sensing device before it has been completely assembled;

FIG. 5 is a plan view of a third embodiment of temperature sensing device according to the invention before it has been completely assembled;

FIG. 6 is a side cross-sectional view of a fourth embodiment of temperature sensing device according to the invention;

FIG. 7 is a side cross-sectional view of a fifth embodiment of temperature sensing device according to the invention;

FIG. 8 is a plan view of the fifth embodiment of temperature sensing device;

FIG. 9 is a side perspective view of a sixth embodiment of temperature sensing device according to the invention;

FIG. 10 is a side cross-sectional view of a fragment of the sixth embodiment along the line and in the direction of arrows 10 in FIG. 9;

FIG. 11 is a cross-sectional elevational view across the sixth embodiment of sensing device probe before the sensing element is emplaced, with the view taken along the line of arrows 11 in FIG. 10;

FIG. 14 shows one assembly of temperature sensing devices; and

FIG. 15 shows a temperature sensing device according to the invention in use.

DESCRIPTION OF PREFERRED EMBODIMENTS

Figure 12:
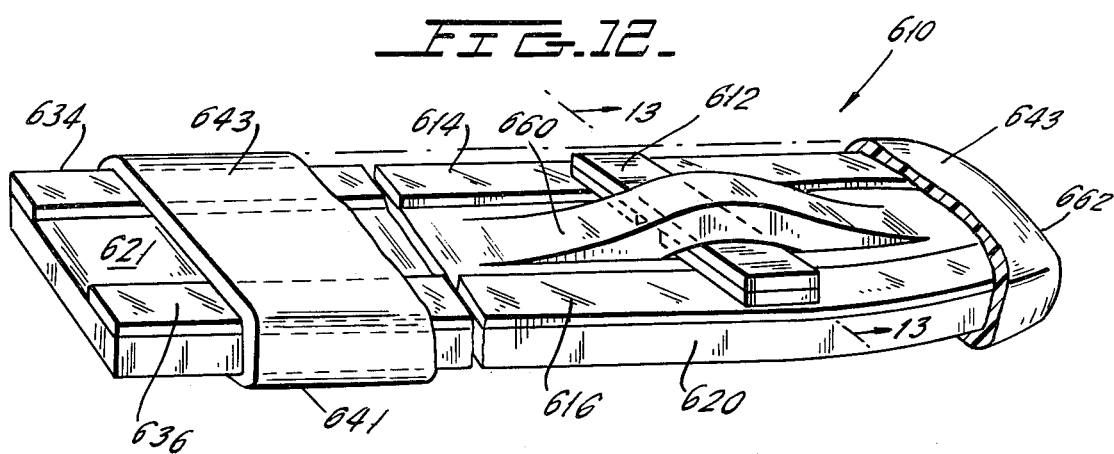
FIG. 12 is a side perspective view of a seventh embodiment of temperature sensing device according to the invention.

The first embodiment of temperature sensing device 10 is shown in FIGS. 1–3. Device 10 is comprised of a thermistor 12, conductors 14 and 16 mechanically and electrically connected to the thermistor, and sheath layers 18, 22 which overlay the conductors 14, 16, respectively, and overlay the thermistor 12.

The thermistor 12 is a conventionally available thermistor of a regular hexahedronal shape which may be purchased in that shape and at a desired rating from, for example, Gulton Industries or YSI Company. The hexahedronal or squared off shape of the thermistor facilitates the attachment of the conductors 14, 16 to contacts formed on opposite flat sides of the thermistor, although other shaped thermistors may be used. Thermistor 12 is 0.050 in. long in each dimension. The rating of a small size thermistor 12 suitable for use in connection with the present invention can reliably be established at 5,000 ohms at 25° C., plus or minus 7 ohms. The material of which thermistor 12 is comprised is a metallic oxide. A thermistor changes its resistivity in a predictable relationship to the change in the temperature at which the thermistor is held.

Although the present invention is specifically described in connection with a temperature sensing element or thermistor 12, it is apparent that it is applicable to a sensor of any other energy level or condition. Broadly expressed, the sensing element would alter its own electrical properties as the condition being sensed change.

Referring to FIG. 2, the substrate sheath layers 18 and 22 are defined from a single sheet 20 of heat and/or radiation shrinkable, flexible, but essentially non-elastic, plastic material. For example, heat sealable, heat shrinkable polyvinylchloride might be used. The material of the sheath 18, 22 around the thermistor 12 is sufficiently thin that it will not significantly interfere with transmission of heat from the object being sensed through the sheath to the thermistor 12. For example, the sheet 20 might be 0.001 in. in thickness.

The entirety of the sheet 20 may be comprised of the same material. Alternatively, only that section of the sheet which is in the vicinity of the thermistor 12 need be of the above described material and the remainder of the sheet can be of a thicker, heavier material. Further, the sheathing material is electrically non-conductive so as to avoid short circuits. Additionally, it is a poor heat conductor, whereby heat is not transmitted along the length of the sheath or removed from the vicinity of the thermistor.

The sheet 20 has a lengthwise fold line 24 defined by scoring of, by perforations through, or by a slight thinning of, or by other markings on the sheet 20.

The conductors 14, 16 are oriented on their respective sheath layers 18, 22 so as to run generally parallel along the length of the sheet 20. The placement of the conductors 14, 16 on their respective sheath layers is so coordinated with the location of the fold line 24 that when the sheet 20 is folded so that the layers 18, 22 are overlaid upon each other, the conductors 14, 16 will not contact each other, thereby avoiding a short circuit.

Both of the conductors 14, 16 are foil strips which are applied to and conventionally secured on their sheath layers 18, 22. The foil strips may be glued on or otherwise fastened on, may be painted on or may be vacuum deposited on the sheath layers. Other conductors, e.g., wires, could be used, but foil strips are preferred.

The conductor 14 has a contact section 26 on which the thermistor 12 is laid. The contact section 26 is normally near the end 28 of the sheet 20 of sheathing material.

The contact section 26 is coated with a conductive gel material, such as Tecknit 72 available from Tecknit Corporation (silver in a viscous silicone), which ensures electric contact between the thermistor 12 and the contact section after the sheath has been heat sealed, as described below. But, this conductive gel layer is not needed if the sheath is sufficiently tightly secured around and remains secured around the conductors and the thermistor. The conductive gel layer is thin, as compared with a conventional solder bead which is not needed in this case. An additional feature of the conductive gel is that it holds the thermistor 12 in place on the contact section 26 until the sheath is sealed.

The foil strip conductor 16 includes the conductor end tab 32 which defines a second contact section and which is so placed that when the sheath layers 18, 22 are folded at the fold line 24, the end tab 32 overlays the opposite side of the thermistor 12 from the contact section 26 and the end tab 32 makes contact with the thermistor 12 on the opposite contact of the thermistor from the conductor 14. The conductive gel material would be used on the surface of the conductor tab 32 in the same manner as it is used on the surface of the contact section 26. The end tab 32 and the conductor 16 ensure that because the conductors 14 and 16 are not aligned, there will still be electrical and mechanical contact with the thermistor 12.

At the ends of the conductors 14, 16 away from the thermistor 12 are defined the contacts 34, 36, respectively, which are shaped to be received by and plugged into cooperating contacts of a potentiometer, for instance of the type described below. The contacts 34, 36 may be formed, for example, by extending the foil conductors 14, 16 slightly beyond the ends of their substrates 18, 22 and by then folding up the foil strips. The contacts 34, 36 are considerably more rigid, thicker and wider than the conductors 14, 16 and each contact is adapted to be plugged into a respective socket provided for it on the potentiometer. Alternatively, any other types of contacts may be secured to the ends of the conductors. The type of contacts 34, 36 to be used must cooperate with the potentiometer contacts.

Once the arrangement shown in FIG. 2 is created, then the sheet 20 is folded over line 24 and the conductor tab 32 is laid atop the thermistor 12. Next, the combined assembly is heat or radiation sealed. The shrinkable material of the sheet 20 is sealed and shrinks to securely press contact sections 26, 32 of the conductors 14, 16 against the thermistor 12 and the sheath material seals the thermistor in position and creates a shield against ambient conditions, such as humidity or contamination, which might affect or damage the thermistor or the electrical connections thereto. Following the sealing, the completed sheath is trimmed to the minimum size to eliminate excess sheath material. The thermometer shown in FIG. 3 results.

FIG. 4 illustrates a second embodiment of temperature sensing device 110, wherein corresponding elements in FIG. 4 are correspondingly numbered to those in FIG. 2, with reference numerals raised by 100. Instead of a single sheet 20 carrying both conductors 14, 16 and the sheet being folded, each of the sheath layers 118, 122 is a separate sheet. To assemble the thermometer 110, the separate sheets 118, 122 are overlaid and aligned with the end tab 132 of the conductor 116 overlaid on the thermistor 112 and with the conductors 114, 116 generally parallel and not contacting each other. Then, as in the embodiment of FIG. 2, the assembly is heat sealed and heat shrunk. The resulting thermometer would appear identical to that shown in FIG. 3.

FIG. 5 shows a third embodiment which accomplishes the same object as the arrangement of FIG. 2, but is slightly different in design. Again, elements corresponding to those shown in FIG. 2 are identified by the same reference numerals, raised by 200. Both conductors 214, 216 are on a single sheet 220. The sheet has the fold line 224 running across the sheet, rather than lengthwise. At the end of the conductor 216 near the thermistor 212, the end tab and contact section 232 of the conductor 216 is joined to the conductor by the joining section 233. When the sheet 220 is folded over fold line 224, the end tab 232 is laid over the thermistor 212 and completes the circuit through the thermistor. When the sheet 220 is now heat-sealed, the thermistor 212 is securely held in a pocket which includes a thermistor and the portions of the conductor 214, 216 near the thermistor.

A separate overlaying sheet (not shown) of the same plastic material as sheet 220 may be laid over the entire sheet 220 and may also be heat sealed thereon, thereby to enhance the protection of the thermistor and to further ensure that the thermistor will not be dislodged through handling of the thermometer 210. The additional sheet also covers and protects the full length of the conductors 214, 216 so that they will not be damaged by rubbing, or the like.

The fourth embodiment of temperature sensing device 310 includes a thermistor 312 and conductors 314 and 316. The thermistor 312 has the characteristics and rating of the thermistor 12, for example. The conductors 314 and 316 are supported on opposite elongated side surfaces of the single elongated support layer or substrate 320. Substrate 320 is comprised of a non-conductive material of sufficient rigidity as to enable the conductors to be adequately supported and yet of sufficient flexibility for the thermometer to bend as needed in use. Appropriate non-conductive material for the supporting substrate 320 is the plastic material identified by the trademark Mylar. An effective thickness between conductors 314, 316 of the Mylar substrate would be 10 mm., although the invention is not limited to a particular thickness substrate. The conductors 314 and 316 comprise foil strips coated on the bottom and the top surfaces of the Mylar support 320, respectively. Although the foil strips are shown as being on opposite surfaces, it is apparent that they may also be on adjacent surfaces of the substrate or even on the same surface of the substrate, in which case they would, as in the first embodiment of FIG. 2, be separated from each other to avoid short circuiting of the conductors. The width and the thickness or height of the conductors 314 and 316 is selected to ensure they are adequately conductive and mechanically strong. The Mylar support 320 need only be wide enough to support the conductors, although, in a particular application, it can be as wide as desired for handling and assembly.

The conductor 316 includes a contact section 326 on its upper side and facing toward a contact on the underside of the thermistor 312. The conductor 314 extends beneath the substrate 320, wraps around the front end 327 of the substrate 320 and includes an extension 329 that extends up to the connecting tab 332. The tab 332 has a contact section 333 on its lower side that faces toward and makes electric contact with the cooperating upper contact of the thermistor 312. At least the portions 329 and 332 of the conductor 314 are sufficiently strong and rigid as to be able to assume the illustrated condition without tearing and without the two conductors 314, 316 contacting each other to create a short circuit. Between the contact sections 326 and 333 of the conductors 316 and 314, respectively, and the contacts on the respective opposed sides of the thermistor 312 there are the respective solder layers 335 and 337 by which the thermistor 312 is secured to the conductors when the completed assembly is heated.

In order to hold the above described elements in place and in addition to the solder layers 335, 337 or as an alternative thereto, a bubble 339 of meltable, non-conductive plastic can hold the conductors and thermistor in place and in contact with each other.

The layers of sheath material 341, 343 are laid over the conductors 314, 316 to protect them and, most important, are laid over the thermistor 312 and the connections thereto of the conductors. The sheath layers may extend away from the thermistor over the conductors a predetermined distance necessary for adequate protection. The sheath layers 341, 343 are of sufficient width that their margins can be overlaid and so that the sheath could be sealed shut. As an alternative to separate sheath layers 341, 343, an elongated pouch or tubular pocket may be defined into which the thermistor and conductors are inserted to define the sheath. The material of the sheath layers 341, 343 would have the characteristics of the materials of the sheath 18, 22 for the first embodiment, except that the sheath in this fourth embodiment does not support conductors which are instead supported on the substrate 320. Thus, the sheath layers 341, 343 need not have the capability or strength for supporting the conductors 314, 316. If the sheath is comprised of shrinkable material, it could be used to secure the thermistor and the conductors together in addition to or in place of at least some of the other means of securement.

The use of an assembly comprised of substrate 320 with conductor 314 and 316 applied to its opposite surfaces has a significant benefit in connection with the formation of contacts 334 and 336 which mate with the contacts of a potentiometer. The contacts 334 and 336 are merely comprised of the terminal end sections of the conductors 314, 316, respectively. The sheath layers 341, 343 do not cover these end portions of the conductors. Consequently, when the assembly of support layer 320 and contacts 334 and 336 are plugged into an appropriate socket having contacts electrically connected with a potentiometer, which contacts are also mechanically biased into engagement with the contacts 334, then the thermistor is electrically connected with the potentiometer. The substrate 320 is of sufficient rigidity and strength as to be able to be forced into and then removed from the socket holding the potentiometer contact without damage to the contact portions 334, 336 of the conductors.

The sheath 341, 343 protects the thermistor and the conductors and assures that no electrolyte at the situs at which temperature is being taken, e.g. spit, perspiration, etc. will complete the circuit between the conductors and short circuit the thermistor. In an environment where there is no danger of short circuiting or of damage due to handling, or the like, then the protective sheath is not necessary, and the assembly shown in FIG. 6 could be made without the sheath 341, 343. Such an electrolyte free and short circuit free environment might be found in taking the temperature of an electrically non-conductive gas, including ambient air, of steam, distilled water, a rigid electrically conducting solid, any electrically non-conducting solid or in a situation where the unsheathed thermometer is moved into a protective sheath or pouch at the time temperature is taken and may be subsequently removed therefrom as, for example, in the case of a sheathed probe for taking temperature. Obviously, without any sheath being present, the temperature sensing device according to the invention will even be more rapidly responsive.

The fifth embodiment of temperature sensing device 410 of FIGS. 7 and 8 would have the same features and characteristics as the fourth embodiment 310 except as to the manner in which the thermistor 412 is electrically connected to the conductors 414 and 416. The conductors 414 and 416 are conductive foil strips on the opposite surfaces of the substrate 420. As can be seen in FIG. 8, the width of the visible conductor 416 and that of the hidden conductor 414 is approximately that of the substrate 420 and may be precisely the same. The conductor 414 need not be extended and folded over as the conductor 314, 329, 332 is.

The arrangement shown in FIG. 7 has the advantage that the substrate 420 provided with conductors 414 and 416 on opposite surfaces can be produced in a continuous assembly on ribbon and individual sections of that assembly comprised of the conductors 414, 416 on the substrate 420 can be cut to a desired length for each thermometer. Such cutting could be done, for example, around the time of the application of the thermistor 412 on the conductor 416. In fact, it could be done before the ribbon is cut, with the thermistors being applied at spaced intervals corresponding to the length of one temperature sensing device. Alternatively, the thermistors could be applied after the ribbon has been cut.

The bottom side contact of the thermistor 412 electrically communicates with the contact section 426 on the upper surface of the conductor 416. To join the upper side contact of thermistor 412 with the other conductor 414, a metal, electrically conductive clip 450 extends between the upper side contact or surface of thermistor 412 and the contact section 433 on the underside of conductor 414. Preferably, the clip 450 is a resilient, U-shaped, metal clip whose opposed legs 452, 454 are normally urged toward each other to effect electric contact. As in the embodiment of FIG. 6, there are solder layers 435 and 437 respectively below and above the thermistor 412 for securely attaching the thermistor to the conductor 416, on the one hand, and for securely attaching the thermistor to the metal clip 450, on the other hand. Between the arm 454 of the clip 450 and the bottom conductor 414 is another solder layer 456, which holds these elements together.

The solder layers 435 and 456 on the conductors 416, 414 may be separately applied at the situs of the thermistor 412 and clip arm 454. In a simpler process, the entire length of the surfaces of the conductors 414 and 416 may be tinned with a layer of solder. It is at the situs of the thermistor and clip arm 454 that the solder on the conductors, when heated, secures the thermistor 412 and arm 454 in place, whereas the remainder of the tinning layers performs no function in the completed temperature sensing device.

The temperature sensing device of FIG. 7 has contacts 434, 436 of the same type as contacts 334, 336. This device also could be sheathed by sheath layers 441 and 443 in the manner shown and described in connection with the temperature sensing device 310 of FIG. 6.

In the sixth embodiment of FIGS. 9–11, a different means for attaching the thermistor to the substrates is shown. The elongated substrate 520 of non-conductive plastic material with elastic "memory", such as Mylar is coated on the entirety of its opposite top and bottom elongated surfaces with the conductive metal foil layers 514 and 516. The substrate is comprised of flexible material and the substrate is dimensioned and has a cross section such that the substrate is flexible. In this embodiment, as suggested above for the embodiment of FIG. 7, the assembly of the substrate and conductive foil strips thereon are formed in a continuous ribbon. Predetermined lengths of the assembly are cut off, each to define one of the temperature sensing devices.

In order to hold the thermistor 512 in place, the assembly comprised of the substrate 520 and the conductors 514 and 516 is cut completely through from the top of the bottom to define a thermistor holding strap 560. Two cuts 554, 556 are made. The cuts do not extend completely across the assembly. Instead, they are wholly inside the peripheral edges of the assembly. The cuts 554, 556 extend lengthwise of the device 510. The narrowed strap 560 is located generally toward the middle of the assembly 514, 516, 520. The length of the cuts 554, 556 along the assembly is relatively short. In addition, they are placed near the front end 562 of the assembly in order that the thermistor 512 will be quite near the front end so that the temperature sensing device 510 need only be inserted a short distance into the object whose temperature is being sensed.

In FIG. 11, it is seen that the two cuts 554 and 556 converge downward through the assembly toward each other. In practice, it has been found that an angle of inclination of about 5° from the vertical is sufficient. A larger angle is illustrated to make the direction of the cuts more apparent. The tilt of the cuts 554 and 556 ensures that when the strap 560 is raised, the lower conductor 514 does not touch and would not normally be expected to be moved to contact the upper conductor 516 which the lower conductor 514 has been raised past.

When the strap 560 is deformed by being raised as shown in FIGS. 9 and 10, the elasticity of the strap 560 causes it to try to restore itself to the condition shown in FIG. 11.

The thermistor 512 is shown as being relatively flatter in thickness, as contrasted with the thermistors of the preceding embodiments. Selection of thermistor shape is a matter of choice, and each thermistor shape can be selected and then calibrated in terms of its resistivity. The shortness of the height of the thermistor 512 enables the strap 560 to have a shorter height arch, whereby the part thereof which engages the upper surface of the thermistor in FIG. 9 will make better contact along the entire width of the thermistor.

To emplace the thermistor 512, the strap 560 is lifted so that the portion of the lower conductor 514 that is to engage the top side contact of the thermistor is raised above the surface of the conductor 516. The thermistor 512 is placed under the uplifted strap 560 and the strap is released, whereupon it tries to restore itself. The restoring force exerted by the strap 560 ensures secure electric contact between the contacts on the opposite surfaces of the thermistor 512 and the respective contact sections of the conductors 514 and 516. In addition, the strap 560 mechanically holds the thermistor 512 securely in place. Although the strap 560 holds the thermistor in place, to ensure electric contact and mechanical securement of the thermistor, the thermistor may be soldered in place.

As described in connection with the preceding embodiments, both of the conductors 514 and 516 may be tinned along their outer surfaces with a quite thin solder layer 566, at least in the vicinity of the strap 560, but more usually along the entire length of the conductors. Once the thermistor has been emplaced, the entire device 510, with the thermistor, is heated to a level which melts the solder around the thermistor and thereby locks the thermistor in place.

As in the preceding embodiment, the thermistors could be emplaced at any time before or after a continuous ribbon comprised of substrate 520 and conductors 514, 516 is formed so long as the cuts 554, 556 have been made. But, it is preferred that all cutting be done at once, such that the sections of the assembly are cut from the ribbon as the cuts to form strap 560 are made. The thermistor is placed later.

As with the preceding embodiments, the entire device 510, at least in the vicinity of the thermistor 512, is preferably enclosed within a sheath 541, 543. The sheath material has the characteristics described above in the first embodiment. If the material of the sheath is heat sealable, then the same heating step that is used to seal the sheath around the thermistor 512 can also be used to solder the thermistor 512 in place. Of course, the sheath 541, 543 may also be heat or radiation shrinkable for the reasons discussed above in connection with the preceding embodiments. Also, the sheath does not cover the complete length of the assembly 514, 516, 520, but instead leaves the terminal end portions of the conductors, at 534, 536, free as contacts for plugging the device into a socket leading to a potentiometer.

The sixth embodiment of temperature sensing device 510 can be manufactured in a continuous procession of automatically performed steps.

Figure 13:
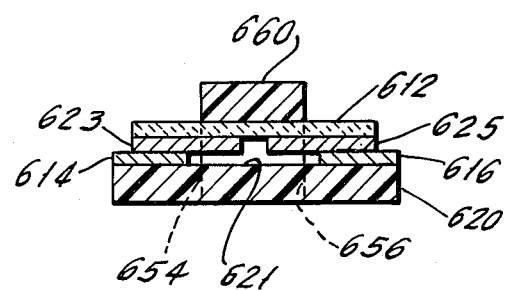
FIG. 13 is a cross-sectional view, along the line and in the direction of arrows 13 in FIG. 12, of the seventh embodiment.

In the seventh embodiment of FIGS. 12 and 13, the temperature sensing device 610 uses a modification of the strap securement technique described in the sixth embodiment of FIGS. 9–11. The elongated substrate 620 is comprised of a non-conductive plastic material with elastic memory, such as Mylar. The substrate is comprised of flexible material and the substrate is dimensioned and has a cross section such that the substrate is flexible. Along and projecting slightly in from the elongated side edges of the top surface 621 of the Mylar substrate 620 are applied the elongated conductive metal foil strips 614 and 616 which serve as the conductors to the thermistor 612. As in the sixth embodiment, the combination of the Mylar substrate and conductive foil layers may be formed in a continuous ribbon assembly. Predetermined lengths of the assembly are cut off, each to define one of the temperature sensing devices of the invention.

The thermistor 612, like the thermistor 512, is relatively flat in its height and is of a length to extend across and contact both of the conductors 614, 616. The underside of thermistor carries its metal contacts 623, 625 which respectively engage and establish electrical contact with the foil strip conductors 614, 616. In this embodiment, both of the thermistor contacts are on the same surface of the thermistor, and an electrical path is established from one conductor, through one thermistor contact, through the body of material of the thermistor, through the other contact and to the respective conductor.

In order to hold the thermistor 612 in place, the substrate 620, between and spaced inwardly from both of the conductor strips 614, 616 is cut completely through from the top surface 621 to the opposite bottom surface, by two cuts 654, 656, thereby defining the thermistor holding strap 660. It is possible for the cuts to extend all the way to the end 662 of the temperature sensing device 612. But to most effectively secure the thermistor in place, the strap cuts 654, 656 should be located wholly within the peripheral edges of the device 610. The cuts extend lengthwise of the temperature sensing device 610. The length of the cuts along the device 610 is relatively short. In addition, they are placed near the front end 662 of the substrate 620. Thus, the thermistor 612 will be quite near to this front end 662 so that the temperature sensing device 610 need only be inserted a short distance into the object whose temperature is being sensed. In FIG. 11 in the sixth embodiment, the cuts 554, 556 converge through the assembly so as to preclude the occurrence of a short circuit. In the seventh embodiment, because the conductors 614, 616 do not extend on or across the strsp 660, such convergence is unnecessary. This further eases the formation of the cuts 654, 656 during the initial fabrication of the assembly of the substrate and the conductors.

As in preceding embodiments, the thermistors 612 could be emplaced at any time before or after a continuous ribbon assembly comprised of substrate 620 and conductors 614, 616 is formed, so long as the cuts 654 and 656 have been made and the strap has been formed. It is preferred that all cutting be done at one time, such that the sections of the assembly are cut from the ribbon as the cuts to form the strap 660 are also being made. The thermistor is emplaced later.

To emplace the thermistor 612, the strap 660 is lifted above the upper surface 621 of the substrate 620. The thermistor 612 is placed under the uplifted strap 660 with its contact 623, 625 applied on the conductors 614, 616. The strap 660 is then released and its elasticity causes it to try to restore itself to the undeformed condition. The restorative force of the strap 660 ensures that the thermistor is held securely in place and ensures the electric contact between the contacts 623, 625 and the contact sections of the conductors 614, 616.

Although the strap 660 mechanically holds the thermistor 612 securely in place, further assurance of electrical and mechanical contact of the thermistor can be achieved by soldering the thermistor contacts to the conductors. As described in connection with preceding embodiments, both of the conductors 614 and 616 may be tinned along their outer surfaces with a quite thin solder layer, at least in the vicinity of the strap 660, but more usually, for convenience of continuous and automatic manufacturing procedures, along the entire length of these conductors. Once the thermistor 612 has been emplaced under the strap, the entire device 610, with the thermistor, is heated to a level which melts the solder around the thermistor and thereby locks the thermistor in place. This heating technique can also be used when a solder bead is separately applied shortly before the thermistor is fastened in place on the substrate 620.

As in the preceding embodiments, the entire device 610, at least in the vicinity of the thermistor 612, is preferably enclosed in a sheath 641, 643. The sheath material has the characteristics described above for the first embodiment. If the material of the sheath is heat sealable and/or shrinkable, then the same heating step that is used to seal the sheath around the thermistor 612 can also be used to solder the thermistor 612 in place. Also, the sheath does not cover the complete length of the assembly 610, but instead leaves the terminal end portions of the conductors 614, 616, at 634, 636, free of the sheath for being plugged into a suitably adapted socket leading to the potentiometer. The arrangement of the conductors 614, 616 on the substrate 620 also lends itself to formation of contacts by the technique described in connection with the first embodiment of FIGS. 1-3 as well as any other techniques described in connection with the present invention.

After the thermometers have been manufactured, then they should be assembled for transportation, storage and ultimate dispensing and use. FIG. 14 illustrates one suggestion for the packaging of thermometers according to the invention. The packaging is shown as being in conjunction with the thermometers 410, although it is obviously applicable to any other thermometers. A sheet of paper 702 is provided. A plurality of the thermometers 410 are laid next to each other on the sheet 702 with the side edges of their sheaths 443, 441 abutting at the joint lines 704 between them. The individual thermometers can be placed on the paper sheet 702 before their assembly is completed. Then, with the thermometers all assembled on the sheet, the entire sheet can be passed through an appropriate heating means which will solder the thermistors 412 into place and seal the sheaths 441, 443 closed and will additionally melt the plastic of the sheaths sufficiently that the plastic will adhere to the paper beneath by in part melting into the interstices of the paper. The abutting sheaths will also be sealed together, but the abutment lines will be weakened. To ensure weakening, the lines 704 may also be perforated lines. Alternatively, the thermometers 410 may be spaced apart from each other and not abut at all. As an individual thermometer is required for use, it is simply manually peeled from the paper 702 and it is torn away from the neighboring thermometer 410. Other arrangements for packaging of thermometers are envisioned including, but not limited to, individual loose packaging, packaging in an appropriate dispenser, arranging the thermometers in a continuous, unbroken ribbon extending lengthwise of the thermometers with the joint between adjacent thermometers being weakened so that the thermometers can be torn from the roll. Other packaging arrangements can be envisioned by one skilled in this art.

FIG. 15 shows one manner of use of the thermometer 410 of FIG. 7. The end of the thermometer 410 which includes the thermistor 412 is placed in the mouth of the patient under his tongue near arterial blood flow. The contacts 434, 436 are placed in the contact containing socket 442 of the potentiometer 440. Details of the potentiometer 40 are not provided herein, it being understood that a conventional potentiometer construction adapted to respond to a resistivity of the rating of the thermistor is adequate for this purpose. The digital read-out gauge 444 on the potentiometer 440 is calibrated in terms of temperature. Therefore, the changes in the resistivity of the thermistor 412 as a result of changes in the sensed temperature of the patient are reflected in calibrated changes in the temperature reading on the gauge 444. The connection of the other embodiments of temperature sensing device to the potentiometer should now be apparent. For the types of contacts 34, 36 of FIGS. 1 and 2 or 634, 636 of FIGS. 12 and 13, the potentiometer contacts would be appropriately shaped to engage and make electric contact.

It is apparent that other devices besides a potentiometer may be employed for sensing the effect of temperature changes on the thermistor.

In all embodiments, the conductor supporting substrates and the sheaths are sufficiently thin, the thermistor is sufficiently small, the volume and weight of the conductors at least in the vicinity of the thermistor are sufficiently light that the thermistor responds almost immediately to the temperature of the patient's body and an accurate temperature reading appears almost instantaneously on the potentiometer gauge.

It is also apparent that the present invention is adaptable for use with sensors for sensing other kinds of energy and other conditions.

Although preferred embodiments of this invention have been described, many variations and modifications will now become apparent to those skilled in the art. It is therefore, preferred that the present invention be limited not by the specific disclosure herein, but only by the appended claims.

I claim:

1. A thermometer, comprising:
   a thermistor which has the characteristic that it changes its electric properties as the temperature to which it is exposed varies; said thermistor having separated first and second electric contacts at which electric contact is established with said thermistor;
   an elongated supporting substrate having elongated side surfaces; said substrate being comprised of flexible material and said substrate being dimensioned and having a cross-section such that said substrate is flexible; a first and a second conductor extending along said flexible substrate and being supported thereby on at least one said side surface of said substrate; said first conductor having a first contact section for connection to said thermistor first contact; said second conductor having a second contact section for connection to said thermistor second contact;
   said thermistor being supported on said substrate;
   first connection means for effecting electrical connection between said thermistor first contact and said first conductor first contact section; second connection means for effecting electrical connection between said thermistor second contact and said second conductor second contact section;

respective third and fourth electric contacts connected with said first and second conductors and being located remote from said thermistor for enabling electric connection of said first and second conductors to another object;

said third and said fourth contacts each comprise a respective electrically contactable section of the respective said one of said first and said second conductors, which said electrically contactable sections are both remote from said first and said second connection means.

2. The thermometer of claim 1, further comprising, a sheath over said thermistor for shielding said thermistor against ambient conditions; said sheath extending over said first and said second conductors and leaving unsheathed and exposed said electrically contactable sections of said conductors; said sheath being comprised of a material which transmits heat to the thermistor, whereby said thermistor may sense temperature and react thereto.

3. The thermometer of claim 2, wherein said first and said second conductors are on different respective said side surfaces of said substrate.

4. An assembly of thermometers on a support, comprising:
a plurality of the said thermometers of claim 3;
a support having a surface of a size sufficient for receiving said thermometers placed on said support surface; said support surface being adapted to be separably bonded to said sheaths of said thermometers;
said thermometers being all placed on said support surface and said sheaths of said thermometers all being in contact with said support surface and said sheaths being separably bonded to said support surface, whereby each said thermometer is carried on said support and is separably bonded thereto.

5. The assembly of thermometers of claim 4, wherein said elongated substrates are arranged generally next to and generally parallel to one another on said support surface.

6. The assembly of thermometers of claim 4, wherein said support surface is comprised of a material having interstices therein; said sheaths of said thermometers being bonded to said support surface by being treated for engaging said interstices thereof.

7. The thermometer of claim 2, wherein said sheath, in the vicinity of and over said thermistor, has a thickness of about 0.001 in.

8. The thermometer of claim 2, wherein said sheath, in the vicinity of and over said thermistor, has a thickness of about 0.001 in.

9. The thermometer of claim 1, wherein said first and said second conductors are on different respective said side surfaces of said substrate.

10. The thermometer of claim 9, wherein said substrate has opposite said side surfaces and said first and said second conductors are on respective opposite said side surfaces.

11. The thermometer of claim 9, wherein each said conductor is comprised of a metal, foil-like layer on its respective said side surface of said substrate.

12. The thermometer of claim 11, wherein said substrate is comprised of electrically non-conductive material.

13. The thermometer of claim 12, wherein said substrate is comprised of a plastics material.

14. The thermometer of claim 13, wherein said first connection means comprises said thermistor first contact sitting on said first conductor first contact section.

15. The thermometer of claim 14, wherein there is a cut formed in and extending completely through the assembly comprised of both said conductors and said substrate, but said cut not extending completely across said assembly; said assembly being so deformed on opposite sides of said cut that the portion of said second conductor at one side of said cut is raised above the portion of said first conductor at the other side of said cut; said second contact section being at said portion of said second conductor which is adjacent to said cut and is raised above said first conductor; said first contact section being at said portion of said first conductor which is adjacent to said cut and above which said second conductor is raised.

16. The thermometer of claim 15, wherein said substrate is comprised of a material having elastic memory, such that said portion of said second conductor adjacent to one side of said cut is biased to return to be adjacent to said second conductor at the other side of said cut and said portion of said first conductor adjacent to one side of said cut is biased to return to be adjacent to said first conductor at the other side of said cut.

17. The thermometer of claim 16, wherein said thermistor is positioned between and is in engagement with said first and said second contact sections.

18. The thermometer of claim 17, wherein said conductors are tinned with solder at least in the vicinity of said first and said second contact sections thereof, thereby to be solderable to said thermistor.

19. The thermometer of claim 17, wherein said substrate has opposite said side surfaces and said first and said second conductors are on respective opposite said side surfaces.

20. The thermometer of claim 17, wherein two of said cuts extend through said assembly and also extend along said assembly in generally the same direction, thereby to define a strap in said assembly between said cuts; said strap including two of said second conductor portions, one each at both said cuts; said first conductor portions being at the opposite sides of both said cuts; said strap and said second conductor portions being deformable with respect to the remainder of said assembly such that said second conductor portions on said strap are raised above said first conductor portions at the opposite sides of said cuts.

21. The thermometer of claim 20, wherein said strap extends lengthwise of said assembly.

22. The thermometer of claim 20, wherein said substrate has opposite said side surfaces and said first and said second conductors are on respective opposite said side surfaces.

23. The thermometer of claim 22, wherein said assembly has peripheral sides which cross both said conductors and said substrate; said cuts being so placed and of such length that said strap is between all of and does not cross any of said peripheral sides of said assembly.

24. The thermometer of claim 23, wherein said strap extends lengthwise of said assembly.

25. The thermometer of claim 23, wherein, measured through said assembly from said first conductor to said second conductor, said cuts converge, thereby to prevent inadvertent contact between said second and said first conductor portions when said assembly has been deformed such that said second conductor portion is above said first conductor portion.

26. The thermometer of claim 9, wherein said first connection means comprises said first contact of said thermistor sitting on said first contact section of said first conductor.

27. The thermometer of claim 26, wherein said second connection means comprises a connecting element extending from said second contact section of said second conductor to said second contact of said thermistor.

28. The thermometer of claim 27, wherein said conductors are tinned with solder at least in the vicinity of said first and said second contact sections thereof, thereby to be solderable to said thermistor.

29. The thermometer of claim 27, wherein said connecting element comprises a metal conductive clip joining said second contact section and said second contact.

30. The thermometer of claim 27, wherein said connecting element comprises a portion of said second conductor, including said second contact section, extending around said substrate to said second contact of said thermistor.

31. The thermometer of claim 1, wherein said first and said second conductors are supported at the same said side surface of said substrate and are spaced apart thereon and extend lengthwise thereof.

32. The thermometer of claim 31, wherein each said conductor is comprised of a metal, foil-like layer on the said side surface of said substrate.

33. The thermometer of claim 32, wherein said substrate is comprised of electrically non-conductive material.

34. The thermometer of claim 33, wherein said substrate is comprised of a plastics material.

35. The thermometer of claim 34, wherein said first connection means comprises said thermistor first contact sitting on said first conductor first contact section and said second connection means comprises said thermistor second contact sitting on said second conductor second contact section.

36. The thermometer of claim 35, further comprising securement means for securing said thermistor on said substrate.

37. The thermometer of claim 36, wherein said conductors are tinned with solder at least in the vicinity of said first and said second contact sections thereof, thereby to be solderable to said thermistor.

38. The thermometer of claim 36, wherein said securement means comprises a cut extending completely through said substrate but not extending completely across said substrate; first and second portions of said substrate defined at opposite sides of said cut; said substrate being so deformed on opposite sides of said cut that said first portion of said substrate at one side of said cut is raised above said second portion of said substrate at the other side of said cut such that a gap is defined between said first and said second portions of said substrate; said thermistor being emplaced in said gap.

39. The thermometer of claim 38, wherein said substrate is comprised of a material having elastic memory, such that said first and said second portions of said substrate are biased to return to the undeformed condition of said substrate, thereby holding said thermistor securely between them.

40. The thermometer of claim 38, wherein two of said cuts extend through said assembly and also extend along said assembly in generally the same direction, thereby to define a strap in said assembly between said cuts; said strap including two of said first substrate portions on said strap at said cuts and two of said second substrate portions each located on the opposite side of a said cut; said strap being deformable with respect to the remainder of said substrate such that said strap is raised above the remainder of said substrate.

41. The thermometer of either of claims 35 or 40, wherein said thermistor first and second contacts are both at one side of said thermistor and said thermistor being so oriented that that said side thereof faces toward said substrate.

42. The thermometer of claim 40, wherein said substrate has peripheral sides surrounding and defining said surface on which said conductors are placed; said cuts being so placed and of such length that said strap is between all of and does not cross any of said peripheral sides of said assembly.

43. The thermometer of claim 42, wherein said strap and said cuts are between said conductors.

44. The thermometer of claim 43, wherein said strap extends lengthwise of said assembly.

45. The thermometer of claim 1, further comprising securement means for securing said thermistor on said substrate.

46. The thermometer of claim 45, wherein said securement means comprises a cut extending completely through said substrate but not extending completely across said substrate; first and second portions of said substrate defined at opposite sides of said cut; said substrate being so deformed on opposite sides of said cut that said first portion of said substrate at one side of said cut is raised above said second portion of said substrate at the other side of said cut such that a gap is defined between said first and said second portions of said substrate; said thermistor being emplaced in said gap.

47. The thermometer of claim 46, wherein said substrate is comprised of a material having elastic memory such that said first and said second portions of said substrate are biased to return to the undeformed condition of said substrate, thereby holding said thermistor securely between them.

48. The thermometer of claim 47, wherein two of said cuts extend through said assembly and also extend along said assembly in generally the same direction, thereby to define a strap in said assembly between said cuts; said strap including two of said first portions on said strap at said cuts; two of said second portions, with each being located on the opposite side of a said cut from a said first portion; said strap being deformable with respect to the remainder of said substrate such that said strap is raised above the remainder of said substrate.

49. The thermometer of claim 45, wherein said substrate is comprised of a material capable of being deformed; said securement means comprising said substrate including a first and a second portion; said substrate being deformed such that said first portion is raised above said second portion, such that a thermistor receiving area is defined between said portions of said substrate; said thermistor being emplaced in said thermistor receiving area.

50. The thermometer of claim 49, wherein said substrate is comprised of a material having elastic memory, such that said first and said second portions of said substrate are biased to return to the undeformed condition of said substrate, thereby holding said thermistor securely between them.

51. A thermometer, comprising:

a thermistor which has the characteristic that it changes its electric properties as the temperature to which it is exposed varies; said thermistor having separated first and second electric contacts at which electric contact is established with said thermistor;

a first electric conductor having a first contact section for connection to said thermistor first contact; a second electric conductor having a second contact section for connection to said thermistor second contact;

connection means for effecting electrical connection between said first contact section and said first contact and between said second contact section and said second contact;

a sheath over said thermistor and over said conductors at least in the vicinity of said first and said second contact sections for shielding said thermistor against ambient conditions; said sheath being of such a thickness and being comprised of a material which allows rapid transmission of heat to said thermistor, whereby said thermistor may sense the changing temperature and react thereto;

said sheath being further comprised of a shrinkable material and said sheath being shrunk over said conductors at said first and said second contact sections and over said thermistor to mechanically hold said conductor contact sections against the respective said thermistor first and second contacts.

52. The thermometer of claim 51, wherein said sheath is comprised of heat shrinkable and heat sealable material and said sheath is heat shrunk and heat sealed over said conductors at said thermistor and over said thermistor.

53. The thermometer of claim 51, wherein said sheath is comprised of radiation shrinkable and radiation sealable material and said sheath is radiation shrunk and radiation sealed over said conductors at said thermistor and over said thermistor.

54. A thermometer, comprising:
a thermistor which has the characteristic that it changes its electric properties as the temperature to which it is exposed varies; said thermistor having separated first and second electric contacts at which electric contact is established with said thermistor;

a first electric conductor having a first contact section for connection to said thermistor first contact; a second electric conductor having a second contact section for connection to said thermistor second contact;

connection means for effecting electrical connection between said first contact section and said first contact and between said second contact section and said second contact;

a sheath over said thermistor and over said conductors at least in the vicinity of said first and said second contact sections for shielding said thermistor against ambient conditions; said sheath being of such a thickness and being comprised of a material which allows rapid transmission of heat to said thermistor whereby said thermistor may sense the changing temperature and react thereto;

a respective third and fourth contact on said first and second conductors remote from said thermistor; said sheath not extending over said third and fourth contacts.

55. The thermometer of claim 54, wherein said sheath extends over said first and said second conductors and leaves unsheathed and exposed said third and fourth contacts.

56. The thermometer of claim 55, wherein said conductors have terminal end portions away from said thermistor at which said third and fourth contacts are located.

57. A thermometer, comprising:
a thermistor which has the characteristic that it changes it electric properties as the temperature to which it is exposed varies; said thermistor having separated first and second electric contacts at which electric contact is established with said thermistor;

a first electric conductor having a first contact section for connection to said thermistor first contact; a second electric conductor having a second contact section for connection to said thermistor second contact;

connection means for effecting electrical connection between said first contact section and said first contact and between said second contact section and said second contact;

said connection means comprises said first and said second contact sections being positioned on the respective one of said first and said second contacts of said thermistor and being in electrical contact therewith;

a sheath over said thermistor and over said conductors at least in the vicinity of said first and said second contact sections for shielding said thermistor against ambient conditions; said sheath being of such a thickness and being comprised of a material which allows rapid transmission of heat to said thermistor whereby said thermistor may sense the changing temperature and react thereto.

58. An assembly of thermometers on a support, comprising:
a plurality of the said thermometers of claim 1;
a support having a surface of a size sufficient for receiving said thermometers placed on said support surface; said support surface being adapted to be separably bonded to said sheaths of said thermometers;

said thermometers being all placed on said support surface and said sheaths of said thermometers all being in contact with said support surface and said sheaths being separably bonded to said support surface, whereby each said thermometer is carried on said support and is separably bonded thereto.

59. The assembly of thermometers of claim 58, wherein said elongated substrates are arranged generally next to and generally parallel to one another on said support surface.

60. The assembly of thermometers of claim 58, wherein said support surface is comprised of a material having interstices therein; said sheaths of said thermometers being bonded to said support surface by being treated for engaging said interstices thereof.

* * * * *